United States Patent [19]
Grube et al.

[11] Patent Number: 5,388,212
[45] Date of Patent: Feb. 7, 1995

[54] DETECTING UNAUTHORIZED MODIFICATION OF COMMUNICATION UNIT BASED ON COMPARISON BETWEEN STORED HARDWARE IDENTIFICATION CODE AND HARDWARE IDENTIFICATION CODE GENERATED FROM OPERATIONAL PLATFORM IDENTIFICATION CODE

[75] Inventors: Gary W. Grube, Palatine; Timothy W. Markison, Hoffman Estates,, both of Ill.

[73] Assignee: Motorola Inc., Schaumburg, Ill.

[21] Appl. No.: 106,018

[22] Filed: Aug. 13, 1993

Related U.S. Application Data

[63] Continuation of Ser. No. 23,298, Feb. 26, 1993.

[51] Int. Cl.6 .............................................. G06F 11/08
[52] U.S. Cl. ................... 395/200; 395/575; 379/62; 379/95; 379/118; 379/145; 371/67.1; 364/222.3; 364/222.5; 364/253.1; 364/284.0; 364/285.4; 364/DIG. 1
[58] Field of Search ............... 395/800, 575, 325, 200, 395/425; 371/20.1, 20.4, 67.1, 68.1, 68.2; 379/60, 62, 95, 118, 127, 145, 183, 185, 437, 451; 380/3, 4

[56] References Cited

U.S. PATENT DOCUMENTS

| | | | |
|---|---|---|---|
| 4,639,549 | 1/1987 | Hirayama et al. | 379/62 |
| 4,731,813 | 3/1988 | Schroeder | 379/62 |
| 4,953,198 | 8/1990 | Daly et al. | 379/61 |
| 5,022,067 | 6/1991 | Hughes | 379/95 |
| 5,109,537 | 4/1992 | Toki | 455/88 |
| 5,239,294 | 8/1993 | Flanders et al. | 340/825.34 |
| 5,249,181 | 9/1993 | Wang et al. | 370/60 |
| 5,255,183 | 10/1993 | Katz | 364/406 |

Primary Examiner—Alyssa H. Bowler
Assistant Examiner—Alpesh M. Shah
Attorney, Agent, or Firm—Timothy W. Markison; Christopher P. Moreno

[57] ABSTRACT

A database unit monitors the communications occurring within at least one communication system for hardware identification codes of communication or broadcast units. Upon detecting the hardware identification code, the database unit compares the one received with a stored hardware identification code for the unit. When the stored hardware code does not match the one received, the database unit indicates that the unit has undergone an unauthorized modification.

12 Claims, 2 Drawing Sheets

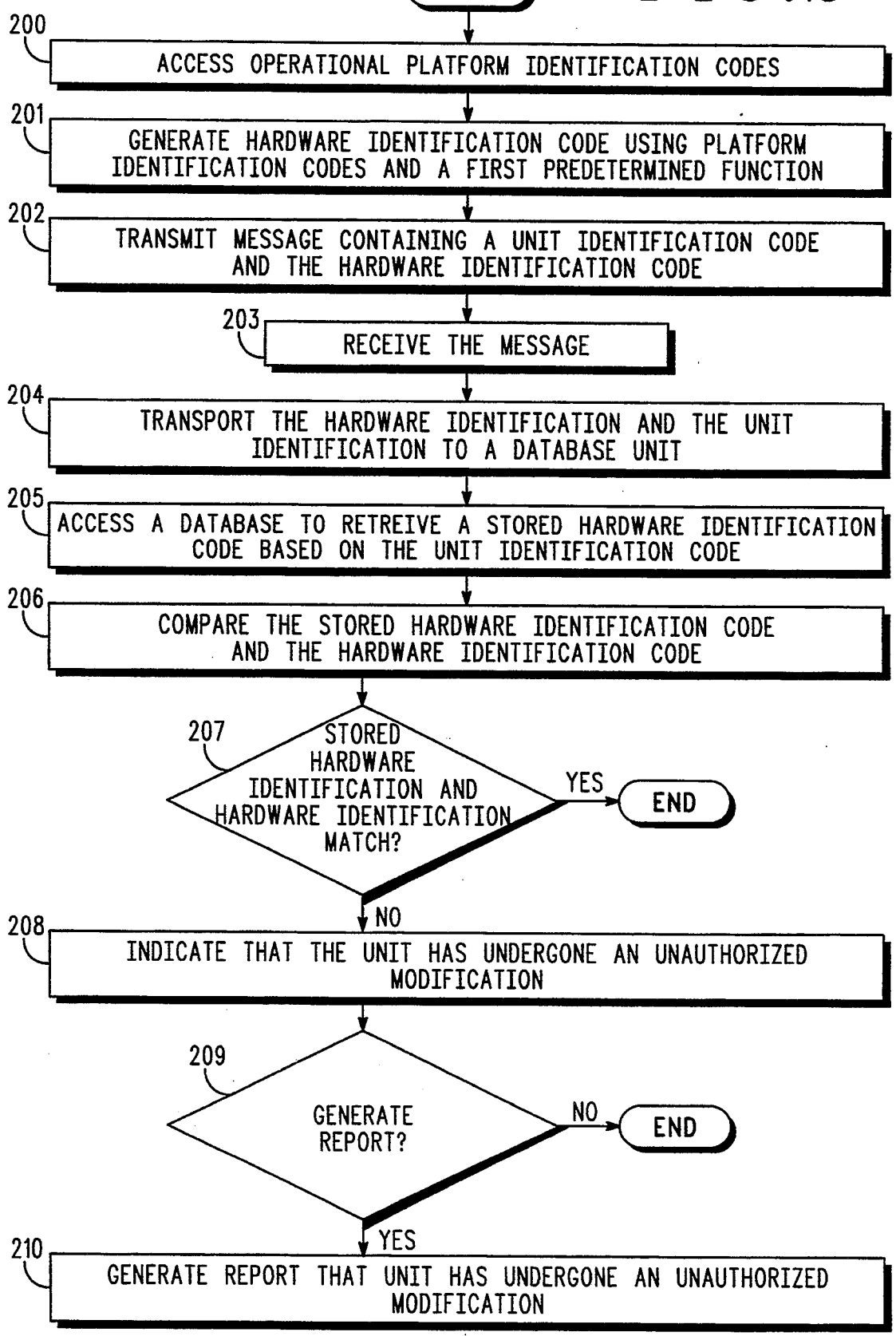

DETECTING UNAUTHORIZED MODIFICATION OF COMMUNICATION UNIT BASED ON COMPARISON BETWEEN STORED HARDWARE IDENTIFICATION CODE AND HARDWARE IDENTIFICATION CODE GENERATED FROM OPERATIONAL PLATFORM IDENTIFICATION CODE

This is a continuation of co-pending patent application having a Ser. No. of 08/023,298, filed on Feb. 26, 1993, and entitled "Detection of Unauthorized Use of Software Applications in Processing Devices".

FIELD OF THE INVENTION

The present invention relates generally to communication systems and, in particular, to the detection of unauthorized modifications to communication units.

BACKGROUND OF THE INVENTION

Land mobile radio communication systems and cellular radio/telephone communication systems (communication systems) are known to include a plurality of communication units, a limited number of communication resources, broadcast units, and a resource controller. Communication units, which may be portable, mobile, or cellular radio/telephones, communicate voice or data information to other communication units or landline communication units via a communication resource and a broadcast unit. For a communication unit to be allocated a communication resource, the unit sends a request to the resource controller, wherein the request indicates that a communication resource is desired and what it is desired for. For example, if a communication unit in a trunked communication system desires to place a talk group call, the request will contain the communication unit's individual identification code and a message indicating that the communication resource is needed for a talk group call. Upon receiving the request, the resource controller processes it by determining whether the communication unit is a registered user of the system and whether the communication unit can request a talk group call. When the resource controller answers both of these questions in the positive, a communication resource is allocated to the communication unit for the talk group call.

The unit may request many other features that a communication system offers. For example, the communication unit may request interconnection calls (i.e. a telephone call through a public telephone switching network), private calls within the communication system, data transmissions, such as a facsimile transmission, secure transmissions, and many other special services. Each of these features are offered to subscribers (users of a communication unit) of a communication system for a fee. As would be expected to provide all, or even a few, of these features, a communication unit is a complex piece of equipment composed of several operational platforms, modules, and/or printed circuit boards.

In an effort to save research and development (R & D) funds, a less scrupulous manufacturer might be inclined to take the operational platforms, or the circuitries contained thereon, from reputable manufacturers and use them in their own products. In addition, the less scrupulous manufacturer may offer services, without the authorization of a reputable manufacturer, to subscribers that upgrade a communication unit having a limited set of special features to a communication unit that offers substantially all of the special features available. In either case, the less scrupulous manufacturer can offer identical products, or upgrade services, at a lower price than the reputable manufacturers because it didn't have the R & D expenses, thus taking market share away from the reputable manufacturers.

In addition to taking market share away for communication units, the less scrupulous manufacturer may also take operational platforms, or the circuitries contained thereon, of a broadcast unit of the reputable manufacturer. With the operational platforms, or the circuitries, of broadcast units, the less scrupulous manufacturer can offer an entire communication system at a reduced price and thus take further market share away from the reputable manufacturer. In order to minimize the market share loss, many reputable manufacturers protect their products, including communication and/or broadcast units, by obtaining patent and copyright protection.

While patent and copyright protection offer a substantial amount of protection, detecting infringement of these rights is difficult. Many manufacturers discover that one of their patented or copyrighted products has been infringed through advertisements of competitors, from customers, or from their sales force. Each of these methods are limited in that the manufacturer is reliant on informants to discover the infringement. In essence, these methods don't offer an active way of discovering infringement. Therefore, a need exists that allows manufacturers, especially those that manufacture communication and/or broadcast units, to actively detect when their patented and/or copyrighted products have been infringed.

BRIEF DESCRIPTION OF THE DRAWINGS

FIG. 2 illustrates a logic diagram that may be used to implement the present invention to detect the unauthorized modification of a communication unit.

DESCRIPTION OF A PREFERRED EMBODIMENT

Figure 1:
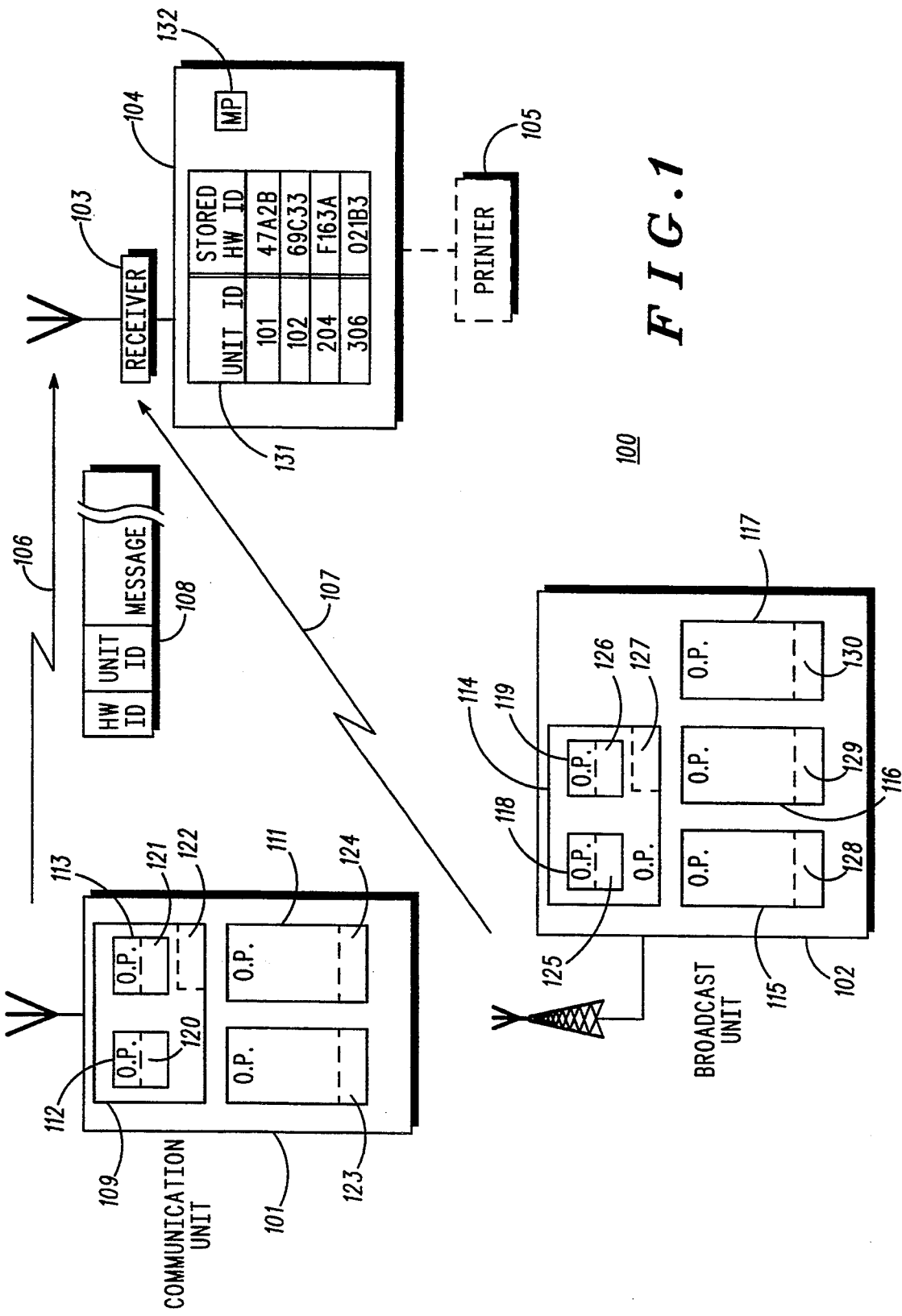
FIG. 1 illustrates a communication system, equipped with a database unit, in accordance with the present invention.

Generally, the present invention provides a method for detecting unauthorized modifications of a communication, or broadcast, unit. This is accomplished by providing a database unit and associated receiver to monitor radio frequency (RF) transmissions of communication, or broadcast, units. In addition to providing a database unit, the signaling protocol of a communication unit is modified to include a hardware identification code. Thus, when the communication unit transmits a request for service, the database unit receives the request, via the associated receiver, and compares the hardware identification code of the communication unit with a stored hardware identification code for the communication unit. When the transmitted hardware identification code does not match the stored hardware identification code, the database unit identifies the communication unit as one that has undergone an unauthorized modification. With this method, a manufacturer of communication units is provided an active means for detecting when their patented and/or copyrighted products have been modified without authorization.

The present invention can be more fully described with reference to FIGS. 1-2. FIG. 1 illustrates communication system 100 that includes a plurality of communication units 101 (only one shown), a plurality of broadcast units 102 (only one shown), a receiver 103, a database unit 104, a printer 105, and a limited number of communication resources 106–107. The communication unit 101, which may be portable, mobile, or cellular radio/telephone, comprises a plurality of operational platforms 109–113. The operational platforms 109–113 may be printed circuit boards or assembly modules that support the circuitry and software programs that make up a communication unit. For example, the circuitry may be a receiver, a transmitter, a digital signal processor, and an encryption/decryption processor; while the software programs, which are stored in memory (not shown), may be the algorithms needed to perform system features, such as talk group call requests, interconnect calling, private trunking calling, and data transmissions. The operational platforms further include a unique platform identification code 120–124. The unique platform identification codes 120–124, which may be derived from integrated circuits that generate a unique serial number, are used to make up the communication unit's hardware identification code. The hardware identification code, along with the communication unit identification code, and a message comprise an inbound signaling word (ISW) 108 which is used to access the system.

The broadcast unit 102, which may be a repeater and/or base station, comprises a plurality of operational platforms 114–119. Like the communication unit, the operational platforms 114–119 support the circuitry and software that make up the broadcast unit 102. The circuitry that makes up a broadcast unit includes a transmitter, a receiver, a power supply, and an encryption/decryption processor that allows either encrypted or unencrypted data to be transceived by the broadcast unit; the software, which is stored in memory (not shown), comprises the algorithms that allow the broadcast unit to facilitate the services provided by the system. For example, the algorithms may be for interconnect calls, group calls, etc. The operational platforms 114–119 further include a unique platform identification code 125–130. The unique platform identification code 125–130, which may be generated by an integrated circuit that provides unique serial numbers, is used to derive the hardware identification code for the broadcast unit. How the unique platform identification codes are used to generate the hardware identification code for the broadcast unit and the communication unit will be discussed below.

The database unit 104 receives information from the receiver 105, wherein the receiver 105 may be a communication unit that is coupled to the database unit 104. The database unit 104, which may be a personal computer that has the capabilities to store large amounts of data (in excess of 100 Mbytes), includes memory 131 and a processing device 132. The memory 131 is arranged into a database that has a unit identification code field and a stored hardware identification field. Each of these fields are controlled by the manufacturer of the communication unit or the broadcast unit to provide accurate information, from the manufacturer's viewpoint, of the communication unit and broadcast units configuration. As is shown, the unit identification code may be a hexadecimal number, or any number system, that is assigned by the manufacturer and is unique to the communication unit or broadcast unit. Likewise, the hardware identification code may be a hexadecimal number.

Having defined the elements of the communication system 100, the basic operation of the system, incorporating the present invention, may be described with reference to FIG. 2. At step 200, when a unit transmits information, wherein a unit may be either a communication unit or a broadcast unit, the unit accesses the operational platform identification codes. A communication unit may transmit information when it is requesting a feature of the system, sending a voice or data message, or responding to a command from the central controller. A broadcast unit transmits information rebroadcasting information sent by units, sending data, or responding to a command from the resource controller. Regardless of the type of transmission, after accessing the operational platform identification codes, the unit generates a hardware identification code based on a first predetermined function 201. The first predetermined function may be any type of mathematical operation. For example, the first predetermined function may be a summer that sums the individual platform identification codes to produce the hardware identification codes, or the first predetermined function may be a shift register that takes a portion of each platform identification code, combines the portions, and shifts the result. Regardless of the function, the database unit must know the function, or at least the expected resultant, to provided the matching process, described below.

Once the hardware identification code is generated, the unit transmits a message, or an inbound signaling word (ISW), to the desired target receiver 202, wherein the ISW contains the hardware identification code, the unique identification code of the unit, and a message. The target receiver may be a broadcast unit if the unit transmitting the message is a communication unit or a communication unit if the unit that is transmitting the message is a broadcast unit. The receiver associated with the database unit receives the message 203 and transports the message to the database unit 204. Note that the receiver associated with the database unit is not necessarily the target receiver and, in practice, the receiver will rarely be the target receiver. Also note that there may be a plurality of receivers in a plurality of different communication units coupled to the database unit to monitor the communication units and broadcast units in those systems. In multiple communication systems, the receiver would transport the message to the database unit as described above and the receiver would also transmit an identification code of the communication system.

Having received the message from the receiver, the database unit access the memory to retrieve the stored hardware identification code for the unit 205. The memory is accessed by using the unit's unique identification code as an indexing term. Once retrieved, the stored hardware identification code is compared with the hardware code contained in the message 206. If the stored hardware identification code substantially matches the hardware identification code contained in the message 207, the process ends for this transmission, but repeats at step 200 for any subsequent transmissions by the unit.

If the stored hardware identification code does not substantially match the hardware identification code contained in the message 207, the database unit indicates that the unit has undergone an unauthorized modification 208. For the purposes of this discussion, substantially matches refers to acceptable error rates that result from RF transmissions and any correction techniques used to compensate for the errors. The indication that the database unit generates may be setting a flag such that an operator of the database unit is notified of the unauthorized modification. Alternatively, a report may be generated 209–210 to indicate the unauthorized modification. Once the indication has been reported, the process ends for this transmission, but repeats at step 200 for subsequent transmissions from the unit.

As a working example of the above described process, assume that a communication unit includes five operational platforms, each with a unique identification code. In addition to the operational platforms having an identification code, the communication unit's housing has a unique identification code. When the communication unit desires to transit a message, a hardware identification code is generated from the operational platform identification codes. Assume that the function used to generate the hardware code, sums the unique identification codes and truncates the least significant bits such that the hardware code is a fixed size (4 bits to 128 bit, for example). Once the hardware code is generated, it, along with the identification code of the communication unit and a message, are transmitted to a target receiver. Assume that the message contains a request for allocation of a communication resource, thus, the target receiver is the resource controller. Because the message is transmitted over an RF medium, the database unit receiver receives the message and transports it to the database unit. The means in which the receiver transports the message to the database unit depends on how the two devices are connected together, which may be any wireline, or wireless, type connections.

Having the message, the database unit compares the stored hardware identification code for the communication with the one contained in the message. When the identification codes don't match, the database unit indicates that the communication unit has undergone an unauthorized modification. For the purposes of this discussion, an unauthorized modification is one that the manufacturer is not aware of, or has not authorized, and results in one or more of the operational platforms of the communication unit being changed. Thus, if an operational platform from one communication unit is placed into another communication unit, both communication units have been modified.

It is understood that the procedures described above can be modified to perform the monitoring on an even more active basis. That is, rather than the database unit only monitoring communications as they occur, it can also transmit requests for information to the communication and broadcast units. When the requested information is provided to the database unit, the process of detecting unauthorized modification continues as described above.

The present invention provides a method for detecting when a communication or broadcast unit has undergone an unauthorized modification. With such a method, a database unit can determine, in an active manner, when a unit has been modified. This is accomplished by comparing a hardware identification code transmitted by the unit with one that is stored in the database unit. If the hardware identification codes don't match, the database unit indicates that the unit has undergone an unauthorized modification. Thus, the manufacturers of communication units and broadcast units can actively determine when their products have been modified, or infringed, as opposed to the passive informant means of prior art detection methods.

We claim:

1. In a communication system that includes a plurality of communication units and at least one radio frequency communication resource, wherein each communication unit of the plurality of communication units includes at least one operational platform, a method for identifying unauthorized modification to a communication unit of the plurality of communication units, the method comprises the steps of:

a) transmitting, by the communication unit via the at least one radio frequency communication resource, a message, wherein the message contains a hardware identification code and a communication unit identification code;

b) receiving, by a receiver via the at least one radio frequency communication resource, the message;

c) transporting, by the receiver, the hardware identification code and the communication unit identification code to a database unit;

d) accessing, by the database unit, a database to retrieve a stored hardware identification code based on the communication unit identification code;

e) comparing, by the database unit, the stored hardware identification code with the hardware identification code; and f) when the stored hardware identification code and the hardware identification code do not substantially match, indicating, by the database unit, that the communication unit has undergone the unauthorized modification; wherein the transmitting of the message step (a) further comprises the steps of:

(1) accessing, by the communication unit, an operational platform identification code for the at least one operational platform; and (2) generating, by the communication unit, the hardware identification code based on the operational platform identification code a first predetermined function.

2. The method of claim 1 further comprises changing the first predetermined function periodically.

3. In the method of claim 1, the indicating of step (f) further comprises generating, by the database unit, a report that the communication unit has undergone the unauthorized modification.

4. In a communication system that includes a plurality of communication units and at least one radio frequency communication resource, wherein each communication unit of the plurality of communication units includes at least one operational platform, a method for identifying unauthorized modification to a communication unit of the plurality of communication units, the method comprises the steps of:

a) accessing, by the communication unit, an operational platform identification code for the at least one operational platform;

b) generating, by the communication unit, a hardware identification code based on the operational platform identification code and a first predetermined function;

c) transmitting, by the communication unit via the at least one radio frequency communication resource, a message, wherein the message contains the hardware identification code and a communication unit identification code;

d) receiving, by a receiver via the at least one radio frequency communication resource, the message;

e) transporting, by the receiver, the hardware identification code and the communication unit identification code to a database unit;

f) recovering, by the database unit, the operational platform identification code based on the hardware identification code and a second predetermined function;

g) accessing, by the database unit, a database to retrieve a stored operational platform identification code based on the communication unit identification code;

h) comparing, by the database unit, the stored operational platform identification code with the operational platform identification code; and i) when the stored operational platform identification code and the operational platform identification code do not substantially match, indicating, by the database unit, that the communication unit has undergone the unauthorized modification.

5. The method of claim 4 further comprises changing the first predetermined function and the second predetermined function periodically.

6. In the method of claim 4, the indicating of step (i) further comprises generating, by the database unit, a report that the communication unit has undergone the unauthorized modification.

7. In a communication system that includes a plurality of broadcast units and at least one radio frequency communication resource, wherein each broadcast unit of the plurality of broadcast units includes at least one operational platform, a method for identifying unauthorized modification to a broadcast unit of the plurality of broadcast units, the method comprises the steps of:

a) transmitting, by the broadcast unit via the at least one radio frequency communication resource, a message, wherein the message contains a hardware identification code and a broadcast unit identification code;

b) receiving, by a receiver via the at least one radio frequency communication resource, the message;

c) transporting, by the receiver, the hardware identification code and the broadcast unit identification code to a database unit;

d) accessing, by the database unit, a database to retrieve a stored hardware identification code based on the broadcast unit identification code;

e) comparing, by the database unit, the stored hardware identification code with the hardware identification code; and f) when the stored hardware identification code and the hardware identification code do not substantially match, indicating, by the database unit, that the broadcast unit has undergone the unauthorized modification; wherein the transmitting of the message step (a) further comprises the steps of:

(1) accessing, by the broadcast unit, an operational platform identification code for the at least one operational platform; and (2) generating, by the broadcast unit, the hardware identification code based on the operational platform identification code a first predetermined function.

8. The method of claim 7 further comprises changing the first predetermined function periodically.

9. In the method of claim 7, the indicating of step (f) further comprises generating, by the database unit, a report that the broadcast unit has undergone the unauthorized modification.

10. In a communication system that includes a plurality of broadcast units and at least one radio frequency communication resource, wherein each broadcast unit of the plurality of broadcast units includes at least one operational platform, a method for identifying unauthorized modification to a broadcast unit of the plurality of broadcast units, the method comprises the steps of:

a) accessing, by the broadcast unit, an operational platform identification code for the at least one operational platform;

b) generating, by the broadcast unit, a hardware identification code based on the operational platform identification code and a first predetermined function;

c) transmitting, by the broadcast unit via the at least one radio frequency communication resource, a message, wherein the message contains the hardware identification code and a broadcast unit identification code;

d) receiving, by a receiver via the at least one radio frequency communication resource, the message;

e) transporting, by the receiver, the hardware identification code and the broadcast unit identification code to a database unit;

f) recovering, by the database unit, the operational platform identification code based on the hardware identification code and a second predetermined function;

g) accessing, by the database unit, a database to retrieve a stored operational platform identification code based on the broadcast unit identification code;

h) comparing, by the database unit, the stored operational platform identification code with the operational platform identification code; and i) when the stored operational platform identification code and the operational platform identification code do not substantially match, indicating, by the database unit, that the broadcast unit has undergone the unauthorized modification.

11. The method of claim 10 further comprises changing the first predetermined function and the second predetermined function periodically.

12. In the method of claim 10, the indicating of step (i) further comprises generating, by the database unit, a report that the broadcast unit has undergone the unauthorized modification.

* * * * *